US012594623B2

(12) United States Patent (10) Patent No.: US 12,594,623 B2
Jeun et al. (45) Date of Patent: Apr. 7, 2026

(54) LASER ANNEALING APPARATUS AND LASER ANNEALING METHOD USING THE SAME

(71) Applicant: Samsung Display Co., Ltd., Yongin-si (KR)

(72) Inventors: Jin Hong Jeun, Hwaseong-si (KR); Akifumi Sangu, Hwaseong-si (KR); Jekil Ryu, Suwon-si (KR); Cheolho Park, Suwon-si (KR); Jeonghun Woo, Seoul (KR); Haesook Lee, Hwaseong-si (KR); Youngsu Chae, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 849 days.

(21) Appl. No.: 17/872,331

(22) Filed: Jul. 25, 2022

(65) Prior Publication Data

US 2023/0135789 A1 May 4, 2023

(30) Foreign Application Priority Data

Nov. 3, 2021 (KR) ........................ 10-2021-0149622

(51) Int. Cl.
*B23K 26/06* (2014.01)
*B23K 26/0622* (2014.01)
(Continued)

(52) U.S. Cl.
CPC ...... *B23K 26/0608* (2013.01); *B23K 26/0622* (2015.10); *B23K 26/064* (2015.10); *B23K 26/352* (2015.10)

(58) Field of Classification Search
CPC ............... B23K 26/352; B23K 26/064; B23K 26/0622; B23K 26/0608
(Continued)

(56) References Cited

U.S. PATENT DOCUMENTS 4,925,523 A * 5/1990 Braren ................. B23K 26/066
219/121.76
6,800,541 B2 10/2004 Okumura
(Continued)

FOREIGN PATENT DOCUMENTS

JP 3860444 B2 * 12/2006 ............. H01L 21/20
KR 100338146 B1 8/2002
(Continued)

*Primary Examiner* — Jimmy Chou
(74) *Attorney, Agent, or Firm* — CANTOR COLBURN LLP

(57) ABSTRACT

A laser annealing apparatus includes a plurality of lasers, a laser controller that controls the plurality of lasers such that a plurality of laser beams generated from the plurality of lasers is emitted at different timings, beam mixer optics that outputs a processing beam by mixing the plurality of laser beams of which output timings are adjusted, and focus optics that outputs the processing beam of which focus is adjusted. The processing beam includes a first processing laser beam having a first pulse, a second processing laser beam having a second pulse following the first pulse, and a third processing laser beam having a third pulse following the second pulse. A first peak of the first pulse is smaller than a second peak of the second pulse, and a third peak of the third pulse is smaller than the second peak.

14 Claims, 12 Drawing Sheets

(51) Int. Cl.
    *B23K 26/064*        (2014.01)
    *B23K 26/352*        (2014.01)
(58) Field of Classification Search
    USPC .................................................... 219/121.61
    See application file for complete search history.

(56)                    References Cited

U.S. PATENT DOCUMENTS

| | | | | | |
|---|---|---|---|---|---|
| 6,908,461 | B2 * | 6/2005 | Momiuchi | ............. | A61B 18/20 |
| | | | | | 398/43 |
| 7,560,660 | B2 * | 7/2009 | Yamazaki | .......... | B23K 26/0738 |
| | | | | | 219/121.76 |
| 7,738,751 | B1 * | 6/2010 | Minden | .................. | G02B 6/425 |
| | | | | | 385/115 |
| 8,217,304 | B2 * | 7/2012 | Cordingley | ............ | B23K 26/04 |
| | | | | | 219/121.76 |
| 8,569,187 | B2 | 10/2013 | Moffatt et al. | | |
| 8,835,800 | B2 * | 9/2014 | Tanaka | ................... | H10D 86/60 |
| | | | | | 438/149 |
| 10,759,000 | B2 * | 9/2020 | Abramov | ................. | G02B 6/43 |
| 2002/0000426 | A1 * | 1/2002 | Mead | ................. | B23K 26/0622 |
| | | | | | 219/121.76 |
| 2002/0088782 | A1 * | 7/2002 | Morita | .............. | B23K 26/0619 |
| | | | | | 219/121.75 |
| 2003/0112322 | A1 * | 6/2003 | Tanaka | .............. | B23K 26/0608 |
| | | | | | 347/256 |
| 2006/0198402 | A1 * | 9/2006 | Hodgson | .............. | H01S 3/2383 |
| | | | | | 372/21 |
| 2008/0121627 | A1 * | 5/2008 | Bruland | ............. | B23K 26/0613 |
| | | | | | 257/E23.15 |
| 2009/0185140 | A1 * | 7/2009 | Chen | .................... | H04N 9/3164 |
| | | | | | 353/31 |
| 2012/0012762 | A1 * | 1/2012 | Nowak | .............. | G02B 27/1006 |
| | | | | | 359/333 |
| 2014/0027417 | A1 * | 1/2014 | Simon | ............... | B23K 26/0732 |
| | | | | | 219/121.65 |
| 2014/0110384 | A1 * | 4/2014 | Kleinert | ............... | B23K 26/352 |
| | | | | | 219/121.68 |
| 2014/0245608 | A1 * | 9/2014 | Morimoto | .............. | B41J 2/1629 |
| | | | | | 219/121.75 |
| 2014/0256161 | A1 * | 9/2014 | Li | ........................ | B23K 26/352 |
| | | | | | 438/795 |
| 2017/0093119 | A1 * | 3/2017 | Suzuki | ................. | G02B 27/126 |
| 2019/0267767 | A1 * | 8/2019 | Krausz | .................. | H01S 3/2383 |
| 2020/0099194 | A1 * | 3/2020 | Price | ....................... | H01S 5/041 |
| 2020/0341361 | A1 * | 10/2020 | Park | ..................... | G02B 27/141 |
| 2020/0388980 | A1 * | 12/2020 | Kyoto | .................... | H01S 3/134 |
| 2020/0401030 | A1 * | 12/2020 | Nakamori | ........... | H04N 9/3161 |
| 2021/0048163 | A1 * | 2/2021 | Kito | ..................... | F21S 45/435 |
| 2021/0069824 | A1 * | 3/2021 | Kobayashi | .......... | B23K 26/035 |
| 2021/0138581 | A1 * | 5/2021 | Cho | ...................... | H01L 21/324 |
| 2022/0359197 | A1 * | 11/2022 | Van Der Wilt | .... | G02B 27/0955 |

FOREIGN PATENT DOCUMENTS

| | | | | |
|---|---|---|---|---|
| KR | 20170014554 A | * | 2/2017 | ........... H01L 21/324 |
| KR | 1020180104913 A | | 9/2018 | |
| KR | 1020180104914 A | | 9/2018 | |
| KR | 101987398 B1 | | 6/2019 | |

* cited by examiner

LASER ANNEALING APPARATUS AND LASER ANNEALING METHOD USING THE SAME

This application claims priority Korean Patent Application No. 10-2021-0149622, filed on Nov. 3, 2021, and all the benefits accruing therefrom under 35 U.S.C. § 119, the content of which in its entirety is herein incorporated by reference.

BACKGROUND

1. Field

Embodiments of the invention described herein relate to a laser annealing apparatus and a laser annealing method using the same.

2. Description of the Related Art

In general, electronic devices, such as a smart phone, a digital camera, a notebook computer, a navigation system, a smart television, and the like, which provide an image to a user include a display device for displaying an image. The display device generates an image and provides the generated image to the user through a display screen.

The display device includes a display panel including a plurality of pixels for generating an image and a driver for driving the display panel. Each of the pixels includes a transistor and a light-emitting element connected to the transistor. The transistor includes a source electrode, a drain electrode, a gate electrode, and a semiconductor layer.

To improve electrical characteristics of the transistor, the semiconductor layer is formed through poly silicon (crystalline silicon) obtained by crystallizing amorphous silicon. A crystallization process of irradiating a laser beam to the amorphous silicon is desired to form the poly silicon.

SUMMARY

Embodiments of the invention provide a laser annealing apparatus for preventing damage to a semiconductor layer, and a laser annealing method using the laser annealing apparatus.

In an embodiment, a laser annealing apparatus includes a plurality of lasers, a laser controller that controls the plurality of lasers such that a plurality of laser beams generated from the plurality of lasers is emitted at different timings, beam mixer optics that outputs a processing beam by mixing the plurality of laser beams of which output timings are adjusted, and focus optics that outputs the processing beam of which focus is adjusted. The processing beam includes a first processing laser beam having a first pulse, a second processing laser beam having a second pulse following the first pulse, and a third processing laser beam having a third pulse following the second pulse. A first peak of the first pulse is smaller than a second peak of the second pulse, and a third peak of the third pulse is smaller than the second peak.

In an embodiment, a laser annealing method includes generating a plurality of laser beams, emitting the plurality of laser beams at different timings, outputting a processing beam by mixing the plurality of laser beams of which output timings are adjusted, and focusing the processing beam on an object to be processed. The processing beam includes a first processing laser beam having a first pulse, a second processing laser beam having a second pulse following the first pulse, and a third processing laser beam having a third pulse following the second pulse. A first peak of the first pulse is smaller than a second peak of the second pulse, and a third peak of the third pulse is smaller than the second peak.

BRIEF DESCRIPTION OF THE DRAWINGS

The above and other objects and features of the invention will become apparent by describing in detail embodiments thereof with reference to the accompanying drawings.

FIG. 5 is a view illustrating pulses of laser beams emitted from lasers illustrated in FIG. 1.

FIG. 6 is a view illustrating pulses of a processing beam generated by laser beams emitted from the lasers illustrated in FIG. 1.

FIGS. 8 to 11 are views illustrating processing beams according to various embodiments of the invention.

DETAILED DESCRIPTION

Figure 1:
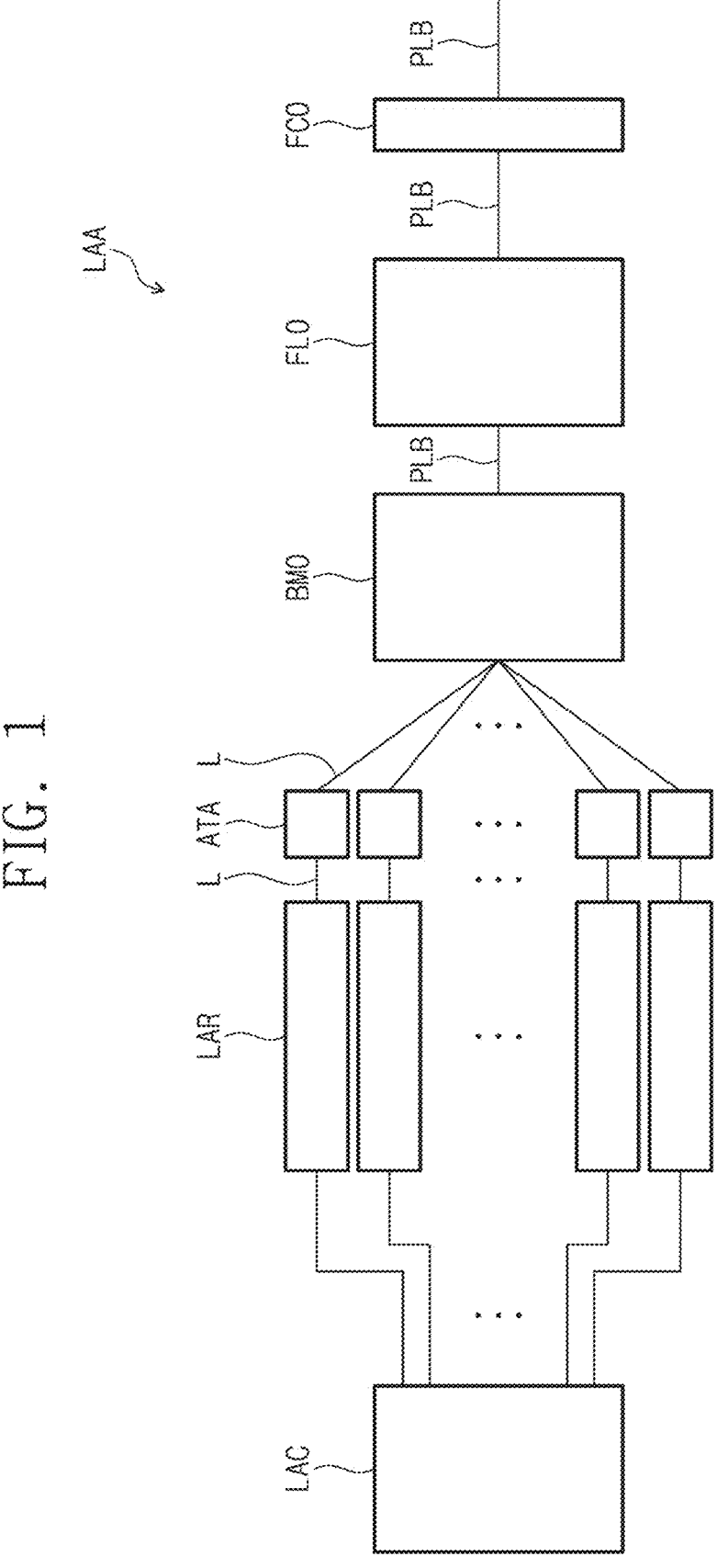
FIG. 1 is a schematic view illustrating an embodiment of a configuration of a laser annealing apparatus according to the invention.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description.

As used herein, the term "and/or" includes all of one or more combinations defined by related components.

Terms such as first, second, and the like may be used to describe various components, but the components should not be limited by the terms. The terms may be used only for distinguishing one component from other components. Without departing the scope of the invention, a first component may be referred to as a second component, and similarly, the second component may also be referred to as the first component, for example. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the invention will be described with reference to the accompanying drawings.

FIG. 1 is a schematic view illustrating an embodiment of a configuration of a laser annealing apparatus according to the invention.

Referring to FIG. 1, the laser annealing apparatus LAA in an embodiment of the invention may include a laser controller LAC, a plurality of lasers LAR, a plurality of attenuators ATA, beam mixer optics BMO, flat line beam optics FLO, and focus optics FCO.

The lasers LAR may be connected to the laser controller LAC. The lasers LAR may be disposed between the laser controller LAC and the attenuators ATA. The attenuators ATA may be disposed between the lasers LAR and the beam mixer optics BMO. The flat line beam optics FLO may be disposed between the beam mixer optics BMO and the focus optics FCO.

The laser controller LAC may control operations of the lasers LAR. The laser controller LAC may control output timings of laser beams L generated from the lasers LAR. In an embodiment, the laser controller LAC may control the lasers LAR such that the laser beams L are emitted at different timings, for example.

The lasers LAR may generate and emit the laser beams L, respectively. The lasers LAR may emit the laser beams L at different timings under the control of the laser controller LAC. In an embodiment, the laser beams L may have an ultra-violet ("UV") wavelength of about 300 nanometers (nm) to about 399 nm and an oscillation frequency of several to tens of kilohertz (kHz), for example.

The lasers LAR may be solid state lasers. In an embodiment, solid state lasers, such as an Yb:YAG laser, a Nd:YAG laser, a Nd:glass laser, a titanium-sapphire laser, or other rare-earth-doped crystal lasers, may be used as the lasers LAR, for example. However, without being limited thereto, gas lasers, such as XeCl2, ArF, or Krf lasers, may be used as excimer lasers.

The laser beams L of which output timings are adjusted may be provided to the attenuators ATA. The attenuators ATA may adjust the powers of the laser beams L provided from the lasers LAR and may provide the laser beams L to the beam mixer optics BMO. In an embodiment, the attenuators ATA may attenuate energy intensities of the laser beams L at predetermined rates, for example. The attenuators ATA may adjust energies of the laser beams L such that the laser beams L have intensities of predetermined magnitudes.

The beam mixer optics BMO may receive, from the attenuators ATA, the laser beams L of which output timings and powers are adjusted. The beam mixer optics BMO may mix the laser beams L provided from the attenuators ATA and may form and output a processing beam PLB. The pulse shape of the processing beam PLB generated by mixing the laser beams L will be described below in detail with reference to FIG. 6.

The processing beam PLB output from the beam mixer optics BMO may be provided to the flat line beam optics FLO. The flat line beam optics FLO may shape the processing beam PLB into a predetermined shape at the same time as equalizing the intensity of the processing beam PLB provided from the beam mixer optics BMO. In an embodiment, the flat line beam optics FLO may shape the processing beam PLB into a line shape, for example.

The line-shaped processing beam PLB generated by the flat line beam optics FLO may be provided to the focus optics FCO. The focus optics FCO may adjust the focus of the processing beam PLB provided from the flat line beam optics FLO and may output the processing beam PLB of which focus is adjusted. The processing beam PLB output from the focus optics FCO may be irradiated to an object to be processed. In an embodiment, the focus optics FCO may include a convex lens to adjust the focus of the processing beam PLB, for example.

Figure 2:
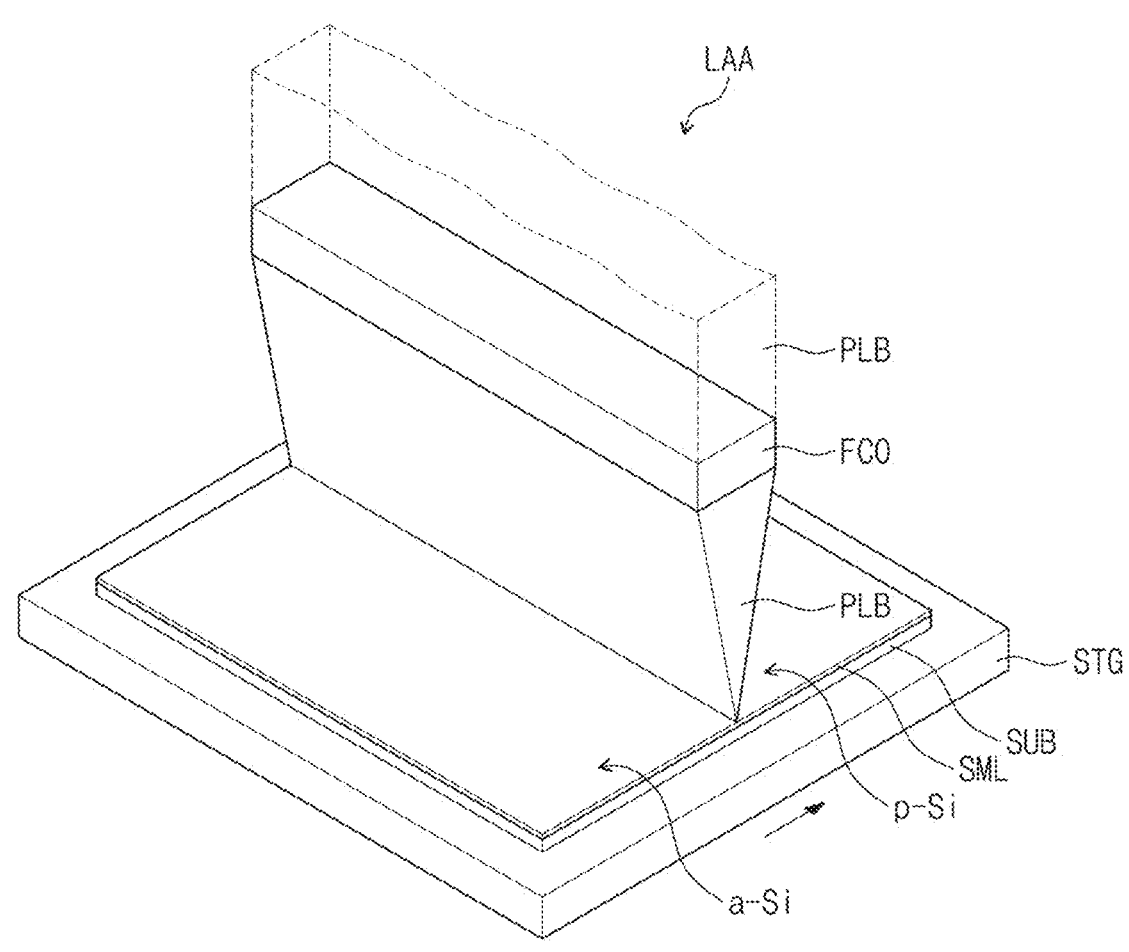
FIG. 2 is a view illustrating a state in which a processing beam output from focus optics illustrated in FIG. 1 is irradiated to an object to be processed.
Figure 2:
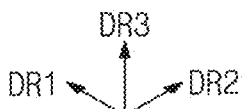

FIG. 2 is a view illustrating a state in which a processing beam output from the focus optics illustrated in FIG. 1 is irradiated to an object to be processed.

Referring to FIGS. 1 and 2, the laser annealing apparatus LAA may include a stage STG. The object to be processed may be disposed on the stage STG. The object to be processed may include a substrate SUB and a semiconductor layer SML disposed on the substrate SUB. The semiconductor layer SML may be defined as a silicon layer.

The stage STG and the substrate SUB may have a plane defined by a first direction DR1 and a second direction DR2 crossing the first direction DR1. Hereinafter, a direction substantially perpendicular to the plane defined by the first direction DR1 and the second direction DR2 is defined as a third direction DR3 Furthermore, the expression "in the plan view" used herein may mean that it is viewed in the third direction DR3.

The focus optics FCO may be disposed over the substrate SUB. The focus optics FCO may adjust the focus of the processing beam PLB to focus the processing beam PLB on the semiconductor layer SML disposed on the substrate SUB.

The processing beam PLB provided to the focus optics FCO may have a linear shape in the plan view. In an embodiment, the processing beam PLB provided to the focus optics FCO may extend in the first direction DR1 in the plan view, for example. Furthermore, the processing beam PLB provided to the focus optics FCO may have a flat shape defined by the first direction DR1 and the third direction DR3.

The stage STG may move in the second direction DR2 to move the substrate SUB in the second direction DR2. As the substrate SUB is moved in the second direction DR2, the processing beam PLB may scan the entire substrate SUB.

The semiconductor layer SML may include amorphous silicon a-Si. The processing beam PLB may be irradiated to the amorphous silicon a-Si of the semiconductor layer SML. The amorphous silicon a-Si may be crystallized into poly silicon (crystalline silicon) p-Si by the processing beam PLB. As a result, the semiconductor layer SML including the poly silicon p-Si may be formed or provided. This process may be defined as a crystallization process.

Although not illustrated, a buffer layer (hereinafter, illustrated in FIG. 4) may be disposed between the substrate SUB and the semiconductor layer SML. A process in which the buffer layer and the semiconductor layer are formed or disposed on the substrate SUB is as follows.

The buffer layer including silicon oxide SiOx and silicon nitride SiNx may be formed or disposed on the substrate SUB. In an embodiment, the amorphous silicon layer a-Si may be formed on the buffer layer by low-temperature plasma enhanced chemical vapor deposition (low-temperature "PECVD"). In this case, silane ($SiH_4$) may be mainly used as a source gas.

Thereafter, when the processing beam PLB is irradiated to the amorphous silicon layer a-Si, the crystalline silicon layer p-Si may be formed in the process in which the amorphous silicon layer a-Si is temporarily melted and then solidified again. In an embodiment, a large amount of hydrogen may be inevitably included in the amorphous silicon layer a-Si in the process in which the amorphous silicon layer a-Si is deposited onto the substrate SUB with the silane ($SiH_4$) as a source gas.

As the amount of hydrogen included in the amorphous silicon layer a-Si is increased, hydrogen may be released from the semiconductor layer SML in a high-temperature process of performing a crystallization process, and therefore the film quality of the semiconductor layer SML may be significantly damaged. In an embodiment of the invention, a dehydrogenation process may be performed to limit hydrogen content to a predetermined level or lower before a crystallization process.

The processing beam PLB generated from the beam mixer optics BMO may include a laser beam for performing the dehydrogenation process and a laser beam for performing the crystallization process. This configuration will be described below in detail with reference to FIG. 6.

Figure 3:
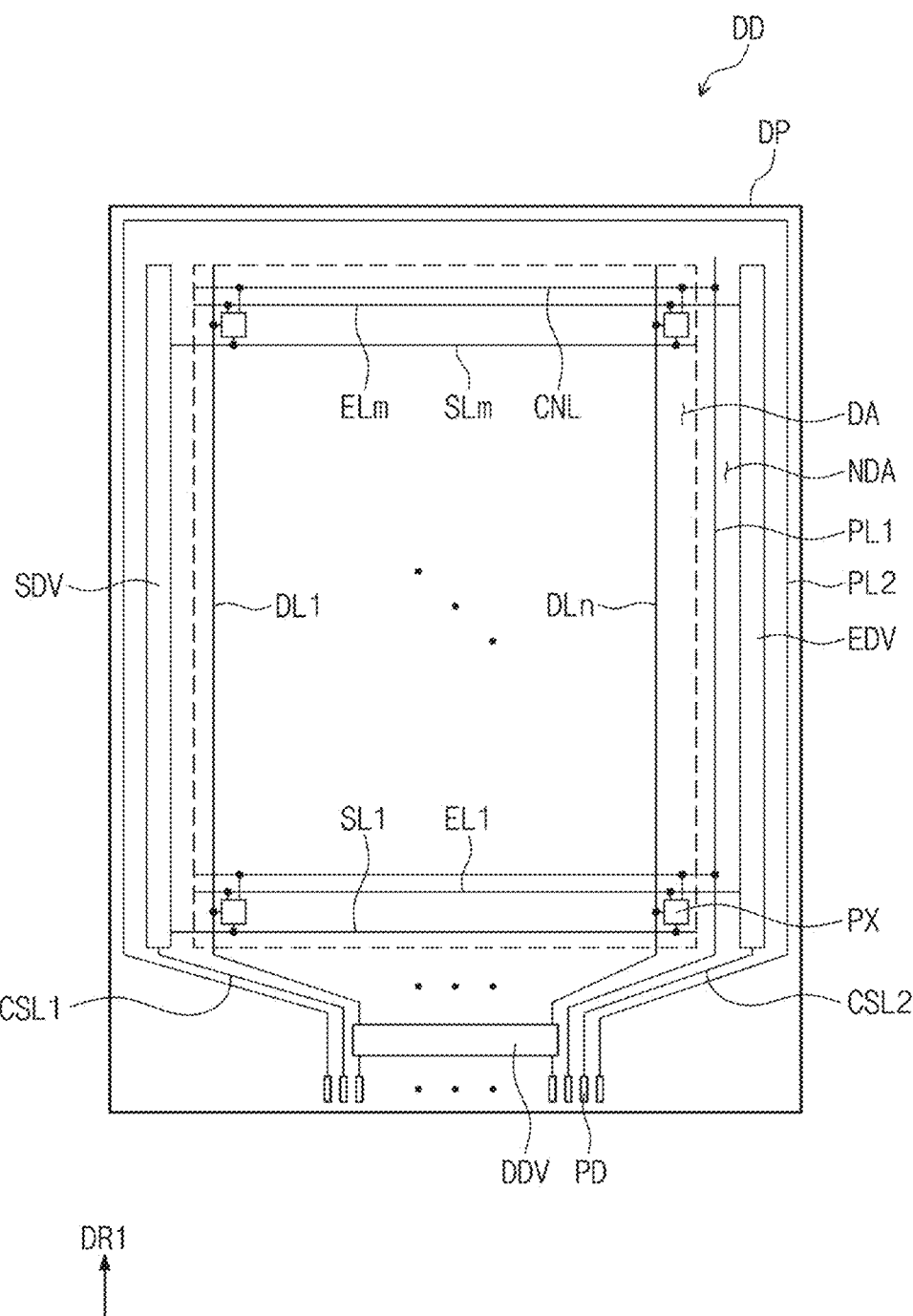
FIG. 3 is a plan view of a display panel manufactured by the laser annealing apparatus illustrated in FIG. 1.
Figure 4:
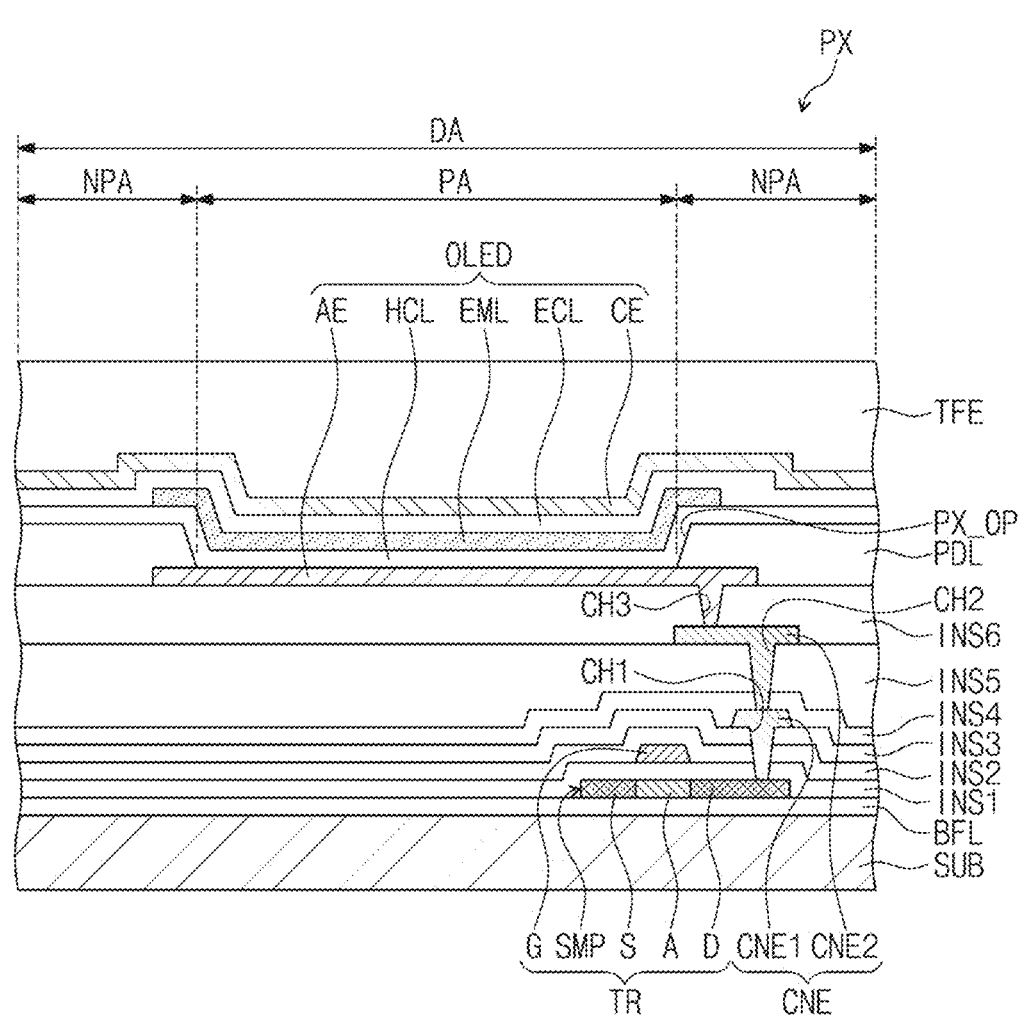
FIG. 4 is a schematic cross-sectional view of any one pixel illustrated in FIG. 3.

FIG. 3 is a plan view of a display panel manufactured by the laser annealing apparatus illustrated in FIG. 1. FIG. 4 is a schematic cross-sectional view of any one pixel illustrated in FIG. 3.

Referring to FIG. 3, a display device DD may include the display panel DP, a scan driver SDV, a data driver DDV, and an emission driver EDV.

The display panel DP may be an emissive display panel and is not particularly limited. In an embodiment, the display panel DP may be an organic light-emitting display panel or an inorganic light-emitting display panel, for example. An emissive layer of the organic light-emitting display panel may include an organic light-emitting material. An emissive layer of the inorganic light-emitting display panel may include quantum dots, quantum rods, or the like. Hereinafter, it will be exemplified that the display panel DP is an organic light-emitting display panel.

The display panel DP may have a quadrangular (e.g., rectangular) shape with long sides extending in the first direction DR1 and short sides extending in the second direction DR2. However, the shape of the display panel DP is not limited thereto. The display panel DP may include a display area DA and a non-display area NDA surrounding the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, connecting lines CNL, and a plurality of pads PD. Here, "m" and "n" are natural numbers.

The pixels PX may be disposed in the display area DA. The scan driver SDV, the emission driver EDV, and the data driver DDV may be disposed in the non-display area NDA. The scan driver SDV and the emission driver EDV may be disposed in the non-display areas NDA adjacent to the long sides of the display panel DP, respectively. The data driver DDV may be manufactured in the form of an integrated circuit chip and may be disposed in the non-display area NDA adjacent to one of the short sides of the display panel DP (e.g., a lower side of the display panel DP in FIG. 3).

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the emission driver EDV.

The first power line PL1 may extend in the first direction DR1 and may be disposed in the non-display area NDA. The first power line PL1 may be disposed between the display area DA and the emission driver EDV. The connecting lines CNL may be disposed in the display area DA. The connecting lines CNL may extend in the second direction DR2 and may be arranged in the first direction DR1. The connecting lines CNL may be connected to the first power line PL1 and the pixels PX. A first voltage may be applied to the pixels PX through the first power line PL1 and the connecting lines CNL connected with each other.

The second power line PL2 may be disposed in the non-display area NDA. The second power line PL2 may extend along the long sides of the display panel DP and the other short side (e.g., an upper side of the display panel DP in FIG. 3) of the display panel DP where the data driver DDV is not disposed. The second power line PL2 may be disposed outward of the scan driver SDV and the emission driver EDV. Although not illustrated, the second power line PL2 may extend toward the display area DA and may be connected to the pixels PX. A second voltage having a lower level than the first voltage may be applied to the pixels PX through the second power line PL2.

The first control line CSL1 may be connected to the scan driver SDV and may extend toward the lower side of the display panel DP in the plan view. The second control line CSL2 may be connected to the emission driver EDV and may extend toward the lower side of the display panel DP in the plan view. The data driver DDV may be disposed between the first control line CSL1 and the second control line CSL2.

The pads PD may be disposed closer to the lower side of the display panel DP than the data driver DDV is. The data lines DL1 to DLn may be connected to the data driver DDV, and the data driver DDV may be connected to the pads PD corresponding to the data lines DL1 to DLn. The first power line PL1, the second power line PL2, the first control line CSL1, and the second control line CSL2 may be connected to the corresponding pads PD.

Although not illustrated, the display device DD may further include a timing controller for controlling operations of the scan driver SDV, the data driver DDV, and the emission driver (also referred to as light emission driver) EDV and a voltage generator for generating the first voltage and the second voltage. The timing controller and the voltage generator may be connected to the corresponding pads PD through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The emission driver EDV may generate a plurality of emission signals, and the emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Emission timing of the pixels PX may be controlled by the emission signals.

Referring to FIG. 4, a pixel PX may include a transistor TR and a light-emitting element OLED. The light-emitting element OLED may include a first electrode AE, a second electrode CE, a hole control layer HCL, an electron control layer ECL, and an emissive layer EML. The first electrode AE may be an anode electrode, and the second electrode CE may be a cathode electrode.

The transistor TR and the light-emitting element OLED may be disposed over a substrate SUB. Although one transistor TR is illustrated, the pixel PX may substantially include a plurality of transistors and at least one capacitor for driving the light-emitting element OLED.

The display area DA may include an emissive area PA corresponding to each of the pixels PX and a non-emissive area NPA around the emissive area PA. The light-emitting element OLED may be disposed in the emissive area PA.

A buffer layer BFL may be disposed on the substrate SUB. The buffer layer BFL may be an inorganic layer. A semiconductor pattern SMP may be disposed on the buffer layer BFL. The semiconductor pattern SMP may be formed or provided by making the semiconductor layer SML illustrated in FIG. 2 subject to patterning. The semiconductor pattern SMP may include poly silicon according to a crystallization process of the laser annealing apparatus LAA.

The semiconductor pattern SMP may be doped with an N-type dopant or a P-type dopant. The semiconductor pattern SMP may include a heavily doped area and a lightly doped area. The heavily doped area may have a higher conductivity than a conductivity of the lightly doped area and may substantially serve as a source electrode and a drain electrode of the transistor TR. The lightly doped area may substantially correspond to an active (or, channel) area of the transistor TR.

A source S, an active area A, and a drain D of the transistor TR may be formed or provided from the semiconductor pattern SMP. A first insulating layer INS1 may be disposed on the semiconductor pattern SMP. A gate G of the transistor TR may be disposed on the first insulating layer INS1. A second insulating layer INS2 may be disposed on the gate G. A third insulating layer INS3 may be disposed on the second insulating layer INS2.

A connecting electrode CNE may be disposed between the transistor TR and the light-emitting element OLED. The connecting electrode CNE may include a first connecting electrode CNE1 and a second connecting electrode CNE2 disposed over the first connecting electrode CNE1.

The first connecting electrode CNE1 may be disposed on the third insulating layer INS3 and may be connected to the drain D through a first contact hole CH1 defined in the first to third insulating layers INS1 to INS3. A fourth insulating layer INS4 may be disposed on the first connecting electrode CNE1. A fifth insulating layer INS5 may be disposed on the fourth insulating layer INS4.

The second connecting electrode CNE2 may be disposed on the fifth insulating layer INS5. The second connecting electrode CNE2 may be connected to the first connecting electrode CNE1 through a second contact hole CH2 defined in the fifth insulating layer INS5. A sixth insulating layer INS6 may be disposed on the second connecting electrode CNE2. The first to sixth insulating layers INS1 to INS6 may be inorganic layers or organic layers.

The first electrode AE may be disposed on the sixth insulating layer INS6. The first electrode AE may be connected to the second connecting electrode CNE2 through a third contact hole CH3 defined in the sixth insulating layer INS6. A pixel defining film PDL exposing a predetermined portion of the first electrode AE may be disposed on the first electrode AE and the sixth insulating layer INS6. An opening PX-OP for exposing the predetermined portion of the first electrode AE may be defined in the pixel defining film PDL.

The hole control layer HCL may be disposed on the first electrode AE and the pixel defining film PDL. The hole control layer HCL may be commonly disposed in the emissive area PA and the non-emissive area NPA. The hole control layer HCL may include a hole transporting layer and a hole injection layer.

The emissive layer EML may be disposed on the hole control layer HCL. The emissive layer EML may be disposed in an area corresponding to the opening PX_OP. The emissive layer EML may include an organic material and/or an inorganic material. The emissive layer EML may generate any one of red light, green light, and blue light.

The electron control layer ECL may be disposed on the emissive layer EML and the hole control layer HCL. The electron control layer ECL may be commonly disposed in the emissive area PA and the non-emissive area NPA. The electron control layer ECL may include an electron transporting layer and an electron injection layer.

The second electrode CE may be disposed on the electron control layer ECL. The second electrode CE may be commonly disposed on the pixels PX. A thin film encapsulation layer TFE may be disposed on the light-emitting element OLED.

The first voltage may be applied to the first electrode AE through the transistor TR, and the second voltage may be applied to the second electrode CE. Holes and electrons injected into the emissive layer EML may be combined to form excitons, and the light-emitting element OLED may emit light as the excitons transition to a ground state.

Figure 5:
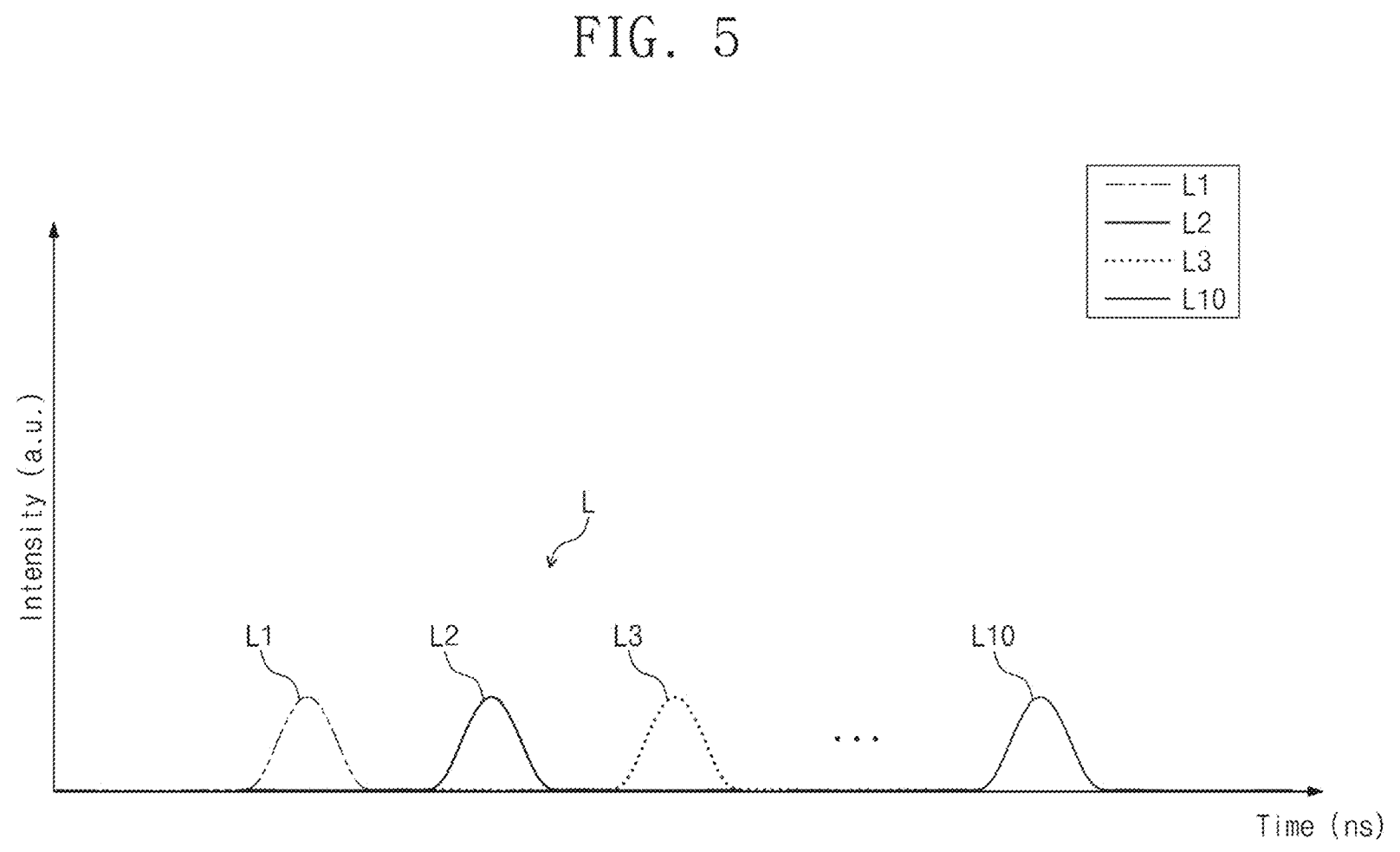

FIG. 5 is a view illustrating pulses of laser beams emitted from the lasers illustrated in FIG. 1.

Referring to FIGS. 1 and 5, the lasers LAR may emit the laser beams L. The laser beams L may include first to tenth laser beams L1 to L10. In an embodiment, ten lasers LAR may be used to emit the first to tenth laser beams L1 to L10, for example. However, the number of lasers LAR and the number of laser beams L are not limited thereto.

The laser controller LAC may control operations of the lasers LAR such that the laser beams L are emitted at different timings. The first to tenth laser beams L1 to L10 may be emitted such that the pulses of the first to tenth laser beams L1 to L10 are spaced apart from one another without overlapping one another. The powers of the first to tenth laser beams L1 to L10 may be adjusted by the attenuators ATA so as to be equal to one another.

The first to tenth laser beams L1 to L10 may be sequentially emitted with predetermined time delays. In an embodiment, the second laser beam L2 may be emitted when a predetermined period of time elapses after the emission of the first laser beam L1, and the third laser beam L3 may be emitted when a predetermined period of time elapses after the emission of the second laser beam L2, for example. The time delay between the first laser beam L1 and the second laser beam L2 and the time delay between the second laser beam L2 and the third laser beam L3 may be equal to each other. This operation may be identically performed until the tenth laser beam L10 is emitted.

FIG. 5 illustrates the output timings of the laser beams L in an embodiment, and in an embodiment of the invention, the output timings of the laser beams L may be set in various ways. Substantially, in an embodiment of the invention, the output timings of the laser beams L may be adjusted such that the pulses of some of the laser beams L overlap one another and the time delays between other laser beams L differ from one another.

Figure 6:
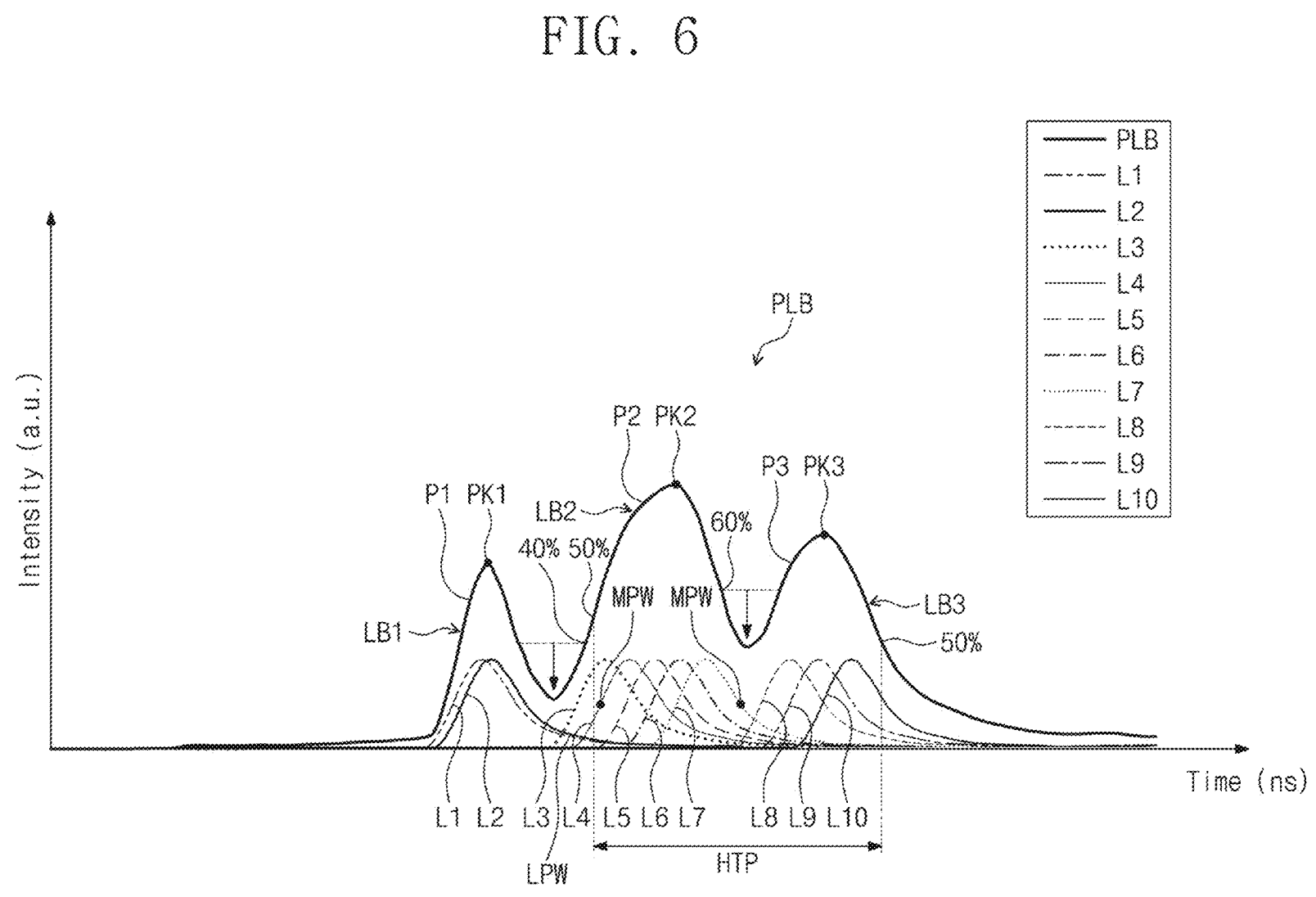
Figure 7:
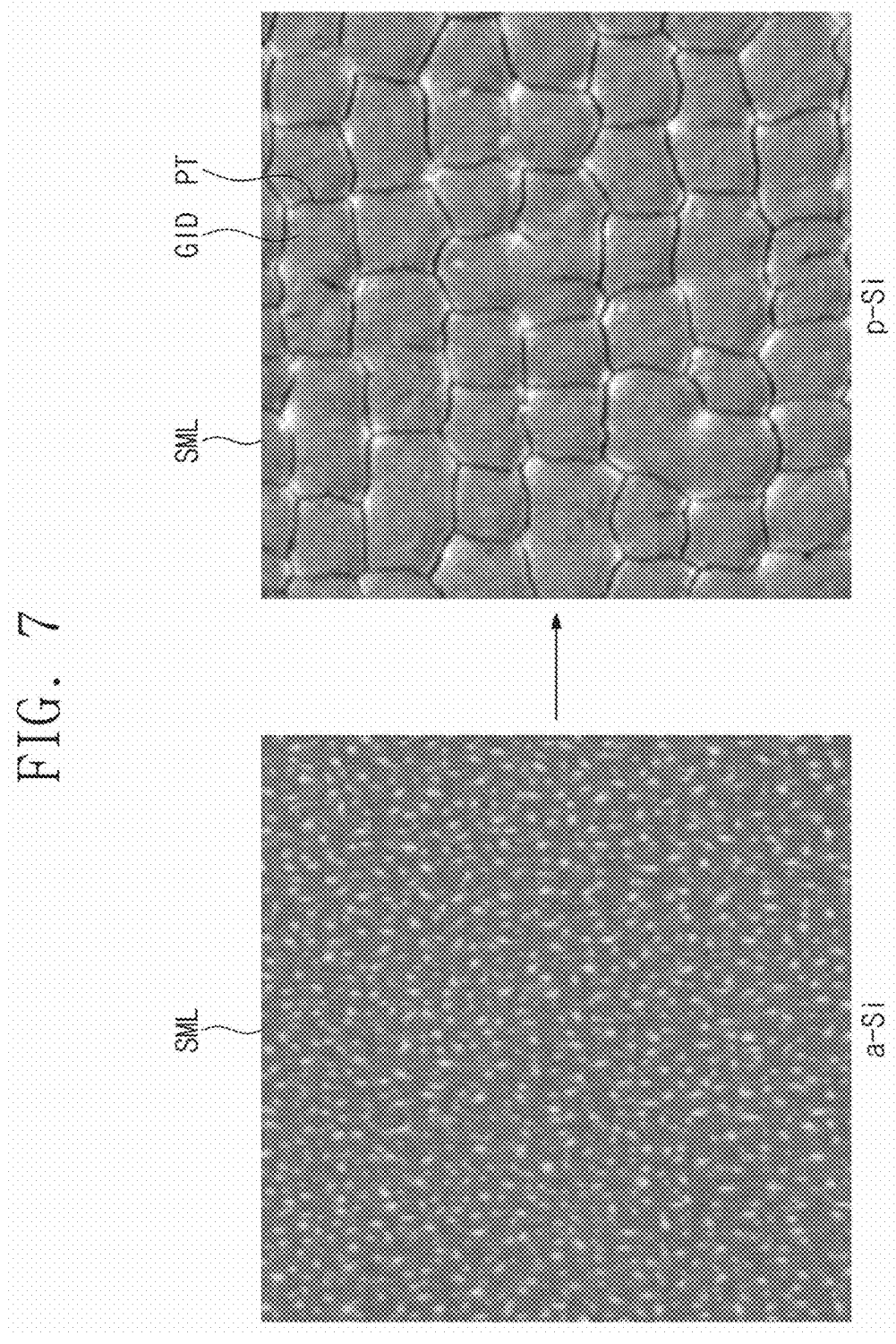
FIG. 7 is a view illustrating a semiconductor layer converted from amorphous silicon into poly silicon by the processing beam illustrated in FIG. 6.

FIG. 6 is a view illustrating pulses of a processing beam generated by laser beams emitted from the lasers illustrated in FIG. 1. FIG. 7 is a view illustrating a semiconductor layer converted from amorphous silicon into poly silicon by the processing beam illustrated in FIG. 6.

Referring to FIGS. 1 and 6, the lasers LAR may sequentially emit the first to tenth laser beams L1 to L10 with time delays under the control of the laser controller LAC. Accordingly, the first to tenth laser beams L1 to L10 may be emitted at different timings. The time delays between the first to tenth laser beams L1 to L10 may be set in various ways. In an embodiment, the time delays between some of the first to tenth laser beams L1 to L10 may differ from one another, for example.

The powers of the first to tenth laser beams L1 to L10 may be adjusted by the attenuators ATA so as to be equal to one another. The beam mixer optics BMO may mix the first to tenth laser beams L1 to L10 to generate the processing beam PLB.

The processing beam PLB may include a first processing laser beam LB1 having a first pulse P1, a second processing laser beam LB2 having a second pulse P2 following the first pulse P1, and a third processing laser beam LB3 having a third pulse P3 following the second pulse P2. The first pulse P1 and the second pulse P2 may partially overlap each other. The second pulse P2 and the third pulse P3 may partially overlap each other.

A first peak PK1 of the first pulse P1 may be smaller than a second peak PK2 of the second pulse P2. A third peak PK3 of the third pulse P3 may be smaller than the second peak PK2. The third peak PK3 may differ from the first peak PK1. In an embodiment, the third peak PK3 may be greater than the first peak PK1, for example. However, embodiments of the invention are not limited thereto. In an embodiment, the third peak PK3 may be equal to the first peak PK1, for example. In an alternative embodiment, the third peak PK3 may be smaller than the first peak PK1.

Each of the first, second, and third processing laser beams LB1, LB2, and LB3 may be generated by mixing at least two laser beams among the first to tenth laser beams L1 to L10. The first processing laser beam LB1 may be generated by mixing at least two laser beams among the first to tenth laser beams L1 to L10. The second processing laser beam LB2 may be generated by mixing at least two other laser beams among the first to tenth laser beams L1 to L10. The third processing laser beam LB3 may be generated by mixing at least two other laser beams L among the first to tenth laser beams L1 to L10.

Specifically, the first processing laser beam LB1 may be generated by mixing the first and second laser beams L1 and L2. The second processing laser beam LB2 may be generated by mixing the third to seventh laser beams L3 to L7. The third processing laser beam LB3 may be generated by mixing the eighth to tenth laser beams L8 to L10.

In the pulses of the first and second laser beams L1 and L2, portions LPW corresponding to low power may extend to the second pulse P2 of the second processing laser beam LB2. However, the third to seventh laser beams L3 to L7 may play a major role in the formation of the second processing laser beam LB2. In an embodiment, portions of the pulses of the third to seventh laser beams L3 to L7 that correspond to about 50 percent (%) or more of the peaks of the third to seventh laser beams L3 to L7 may be disposed in the second pulse P2 of the second processing laser beam LB2, for example.

In an embodiment of the invention, in this case, the second processing laser beam LB2 may be defined as being generated by the third to seventh laser beams L3 to L7. For the same reason, the first processing laser beam LB1 may be defined as being generated by the first and second laser beams L1 and L2, and the third processing laser beam LB3 may be defined as being generated by the eighth to tenth laser beams L8 to L10.

For this mixing operation, the first and second laser beams L1 and L2 may be emitted adjacent to each other in time, and the third to seventh laser beams L3 to L7 may be emitted adjacent to one another in time. Furthermore, the eighth to tenth laser beams L8 to L10 may be emitted adjacent to one another in time.

The time delay between the first and second laser beams L1 and L2, the time delay between the third to seventh laser beams L3 to L7, and the time delay between the eighth to tenth laser beams L8 to L10 may differ from one another. In an embodiment, the time delay between the first and second laser beams L1 and L2 may be less than the time delay between the third to seventh laser beams L3 to L7, for example. The time delay between the third to seventh laser beams L3 to L7 may be less than the time delay between the eighth to tenth laser beams L8 to L10.

The third to seventh laser beams L3 to L7 may be emitted with a time delay after the first and second laser beams L1 and L2, and the eighth to tenth laser beams L8 to L10 may be emitted with a time delay after the third to seventh laser beams L3 to L7. In an embodiment, the time delay between the second and third laser beams L2 and L3 and the time delay between the seventh and eighth laser beams L7 and L8 may be greater than the time delay between the eighth to tenth laser beams L8 to L10, for example.

The second processing laser beam LB2 may be generated by mixing the five laser beams L3 to L7. The third processing laser beam LB3 may be generated by mixing the three laser beams L8 to L10, and the first processing laser beam LB1 may be generated by mixing the two laser beams L1 and L2. Accordingly, the number of laser beams L3 to L7 forming the second processing laser beam LB2 may be larger than the number of laser beams L8 to L10 forming the third processing laser beam LB3 and the number of laser beams L1 and L2 forming the first processing laser beam LB1.

In an embodiment, a first valley VAL1 between the first pulse P1 and the second pulse P1 may be set to about 40% or less of the second peak PK2. In an embodiment, a second valley VAL2 between the second pulse P2 and the third pulse P3 may be set to about 60% or less of the second peak PK2. In an embodiment, the time interval HTP between a left point of the second pulse P2 that corresponds to about 50% of the second peak PK2 and a right point of the third pulse P3 that corresponds to about 50% of the third peak PK3 may be set to about 40 nanoseconds (ns) to about 200 ns. The time interval HTP may be defined as the application time of the second and third pulses P2 and P3.

As the application time of the second and third pulses P2 and P3 is increased, excessive heat may be applied to the semiconductor layer SML, and therefore the semiconductor layer SML may be damaged. Accordingly, the application time of the second and third pulses P2 and P3 may preferably be set to about 200 ns or less, and in an embodiment of the invention, the application time of the second and third pulses P2 and P3 may be set to about 40 ns to about 200 ns.

Referring to FIGS. 2 and 6, the processing beam PLB may be irradiated to the semiconductor layer SML to perform a dehydrogenation process and a crystallization process. After the first processing laser beam LB1 is irradiated to the semiconductor layer SML, the second laser beam LB2 may be irradiated to the semiconductor layer SML. After the second processing laser beam LB2 is irradiated to the semiconductor layer SML, the third processing laser beam LB3 may be irradiated to the semiconductor layer SML.

The first processing laser beam LB1 having lower power than the second processing laser beam LB2 may be irradiated to the semiconductor layer SML to perform a hydrogenation process. Hydrogen may be generated and diffused from the amorphous silicon a-Si of the semiconductor layer SML by the first processing laser beam LB1 and may be removed.

Referring to FIGS. 6 and 7, the second processing laser beam LB2 having higher power than the first processing laser beam LB1 may be irradiated to the semiconductor layer SML to perform a crystallization process. The crystallization process may be defined as an annealing process.

The amorphous silicon a-Si may be crystallized into the poly silicon p-Si by the second processing laser beam LB2. The poly silicon p-Si may include grain patterns GID. The peripheries of the grain patterns GID may include protrusions PT.

The crystallization process may be performed a plurality of times. In an embodiment, after the second processing laser beam LB2 is irradiated to the semiconductor layer SML, the third processing laser beam LB3 having lower power than power of the second processing laser beam LB2 may be irradiated to the semiconductor layer SML, for example. In this case, the arrangement state of the grain patterns GID may be more regularly formed or provided. When the arrangement state of the grain patterns GID is more regularly formed or provided, the electron mobility of the poly silicon p-Si may be increased.

Although not illustrated, an additional laser beam may be irradiated to the semiconductor layer SML after the third processing laser beam LB3 is irradiated.

When the crystallization process is directly performed by the second processing laser beam LB2 without the performance of the dehydrogenation process, hydrogen may be explosively generated from the amorphous silicon a-Si, and therefore the film quality of the semiconductor layer SML may be damaged. However, hydrogen content of the semiconductor layer SML may be reduced by removing a predetermined amount of hydrogen from the semiconductor layer SML with the first processing laser beam LB1. Accordingly, the amount of hydrogen generated in the crystallization process may be decreased, and thus damage to the film quality of the semiconductor layer SML may be decreased.

The laser annealing apparatus LAA in an embodiment of the invention may easily generate the first processing laser beam LB1 with low power and the second processing laser beam LB2 with high power by mixing the laser beams L. After the dehydrogenation process of removing hydrogen from the semiconductor layer SML in advance is performed by the first processing laser beam LB1, the crystallization process of the semiconductor layer SML may be performed by the second processing laser beam LB2. As the hydrogen is removed from the semiconductor layer SML in advance, damage to the semiconductor layer SML that is likely to be caused by the hydrogen may be prevented in the crystallization process.

FIGS. 8 to 11 are views illustrating processing beams according to various embodiments of the invention.

The following description will be focused on the difference between the processing beam PLB illustrated in FIG. 6 and the processing beams PLB-1 to PLB-4 illustrated in FIGS. 8 to 11.

Referring to FIGS. 8 to 11, unlike in FIG. 6, the output timings of the first to tenth laser beams L1 to L10 may be adjusted in various ways to generate the processing beams PLB-1 to PLB-4 having various pulse shapes.

Figure 8:
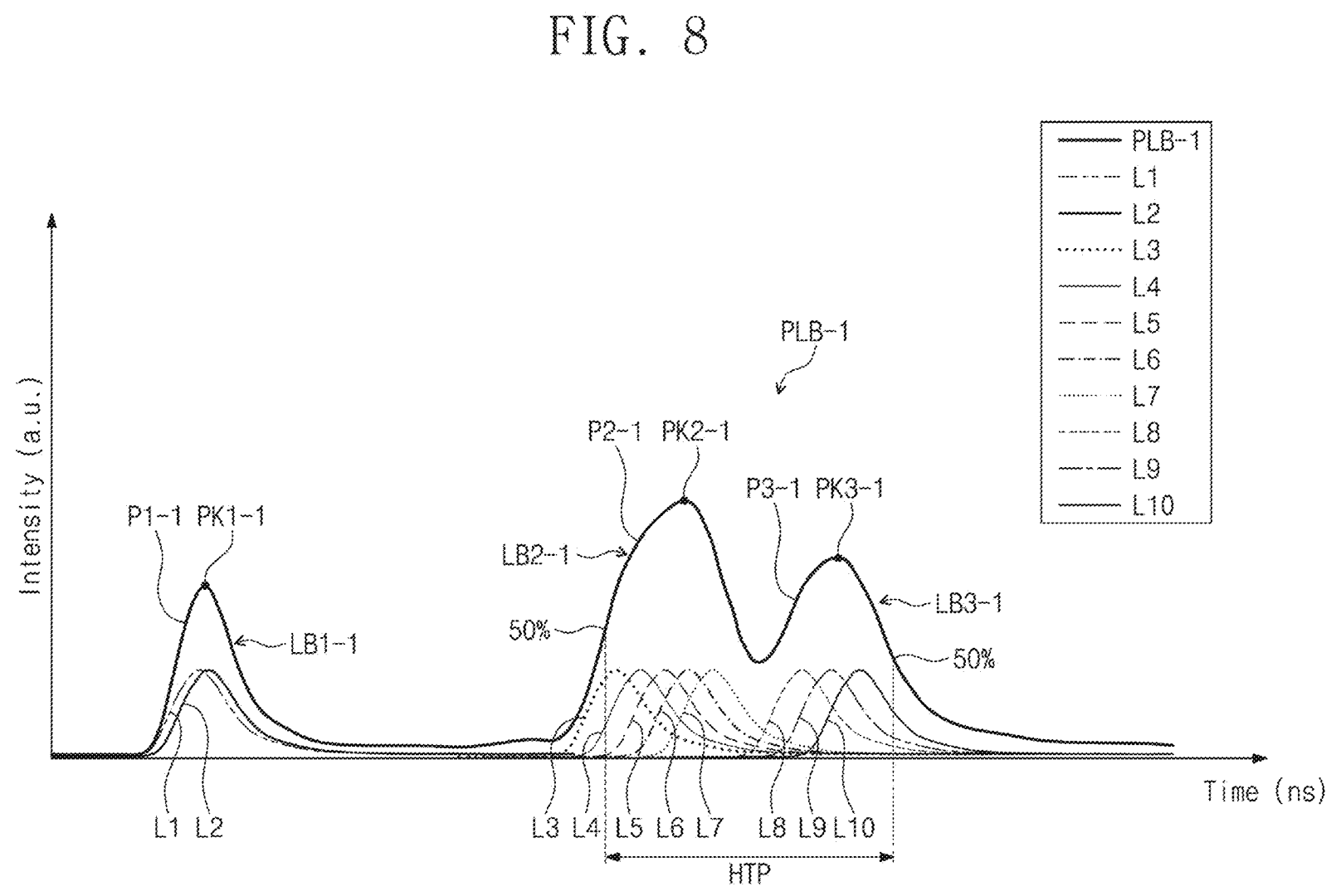

Referring to FIG. 8, the processing beam PLB-1 may be generated by mixing the first to tenth laser beams L1 to L10 emitted at different timings. The processing beam PLB-1 may include a first processing laser beam LB1-1 having a first pulse P1-1, a second processing laser beam LB2-1 having a second pulse P2-1, and a third processing laser beam LB3-1 having a third pulse P3-1. The first pulse P1-1 and the second pulse P2-1 may be spaced apart from each other. The second pulse P2-1 and the third pulse P3-1 may partially overlap each other.

The first processing laser beam LB1-1 may be generated by mixing the first and second laser beams L1 and L2. The second processing laser beam LB2-1 may be generated by mixing the third to seventh laser beams L3 to L7. The third processing laser beam LB3-1 may be generated by mixing the eighth to tenth laser beams L8 to L10.

To space the second pulse P2-1 apart from the first pulse P1-1, the time interval (e.g., the time delay) between the first and second laser beams L1 and L2 and the third to seventh laser beams L3 to L7 may be greater than the time interval in FIG. 6. In this case, the valley between the first pulse P1-1 and the second pulse P2-1 may be set to about 10% or less of a second peak PK2-1.

A first peak PK1-1 may be smaller than the second peak PK2-1, and a third peak PK3-1 may be smaller than the second peak PK2-1. The third peak PK3-1 may be greater than the first peak PK1-1.

Figure 9:
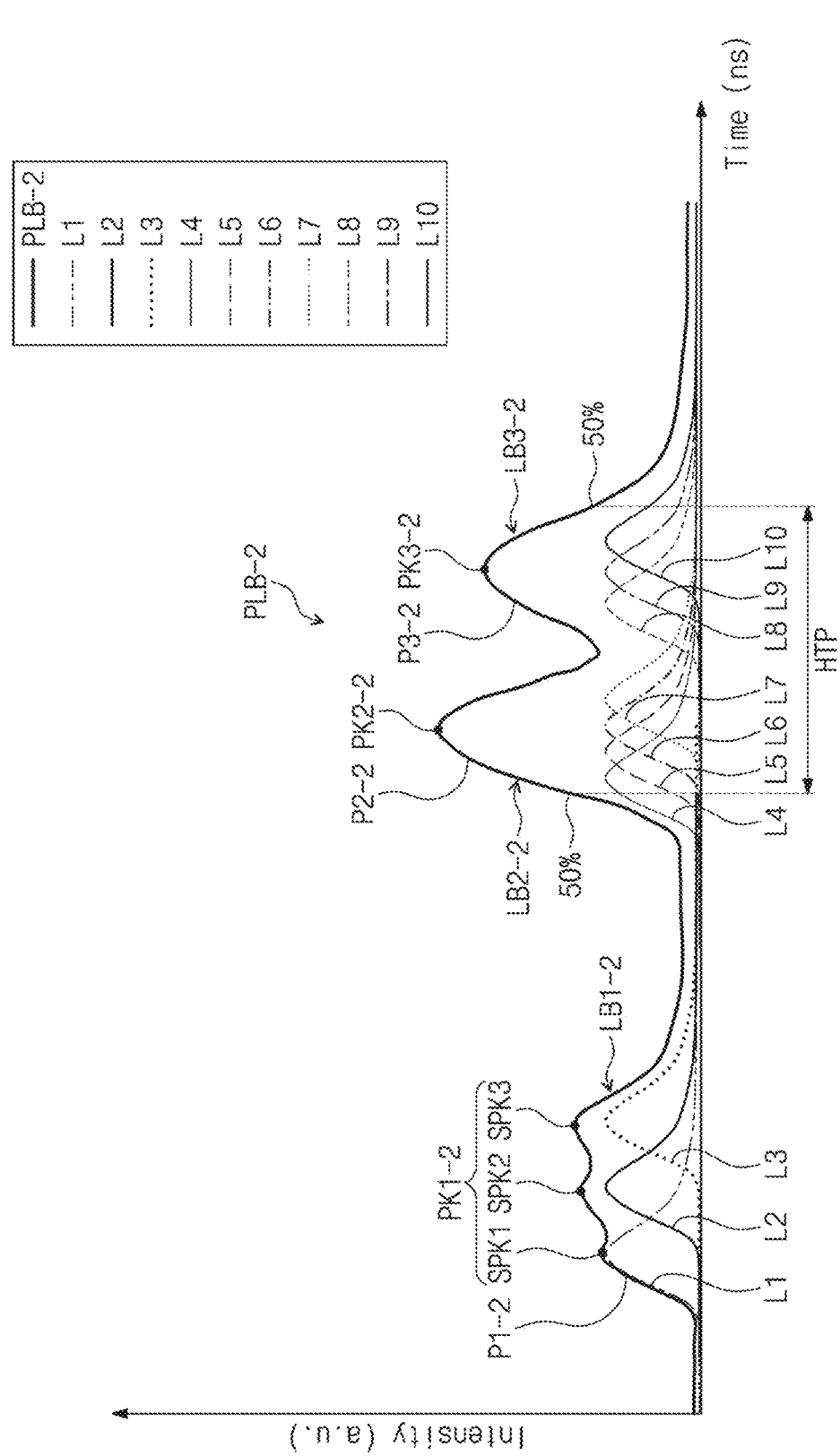

Referring to FIG. 9, the processing beam PLB-2 may be generated by mixing the first to tenth laser beams L1 to L10 emitted at different timings. The processing beam PLB-2 may include a first processing laser beam LB1-2 having a first pulse P1-2, a second processing laser beam LB2-2 having a second pulse P2-2, and a third processing laser beam LB3-2 having a third pulse P3-2. The first pulse P1-2 and the second pulse P2-2 may be spaced apart from each other, and the second pulse P2-2 and the third pulse P3-2 may partially overlap each other.

The first processing laser beam LB1-2 may be generated by mixing the first to third laser beams L1 to L3. The second processing laser beam LB2-2 may be generated by mixing the fourth to seventh laser beams L4 to L7. The third processing laser beam LB3-2 may be generated by mixing the eighth to tenth laser beams L8 to L10.

The time delay between the first to third laser beams L1 to L3 may be greater than the time delay between the fourth to seventh laser beams L4 to L7. The time delay between the first to third laser beams L1 to L3 may be greater than the time delay between the eighth to tenth laser beams L8 to L10.

A first peak PK1-2 may be smaller than a second peak PK2-2, and a third peak PK3-2 may be smaller than the second peak PK2-2 and greater than the first peak PK1-2. The first peak PK1-2 may include first to third sub-peaks SPK1, SPK2, and SPK3 having different values from each other. The first sub-peak SPK1 may be smaller than the second sub-peak SPK2, and the second sub-peak SPK2 may be smaller than the third sub-peak SPK3.

Figure 10:
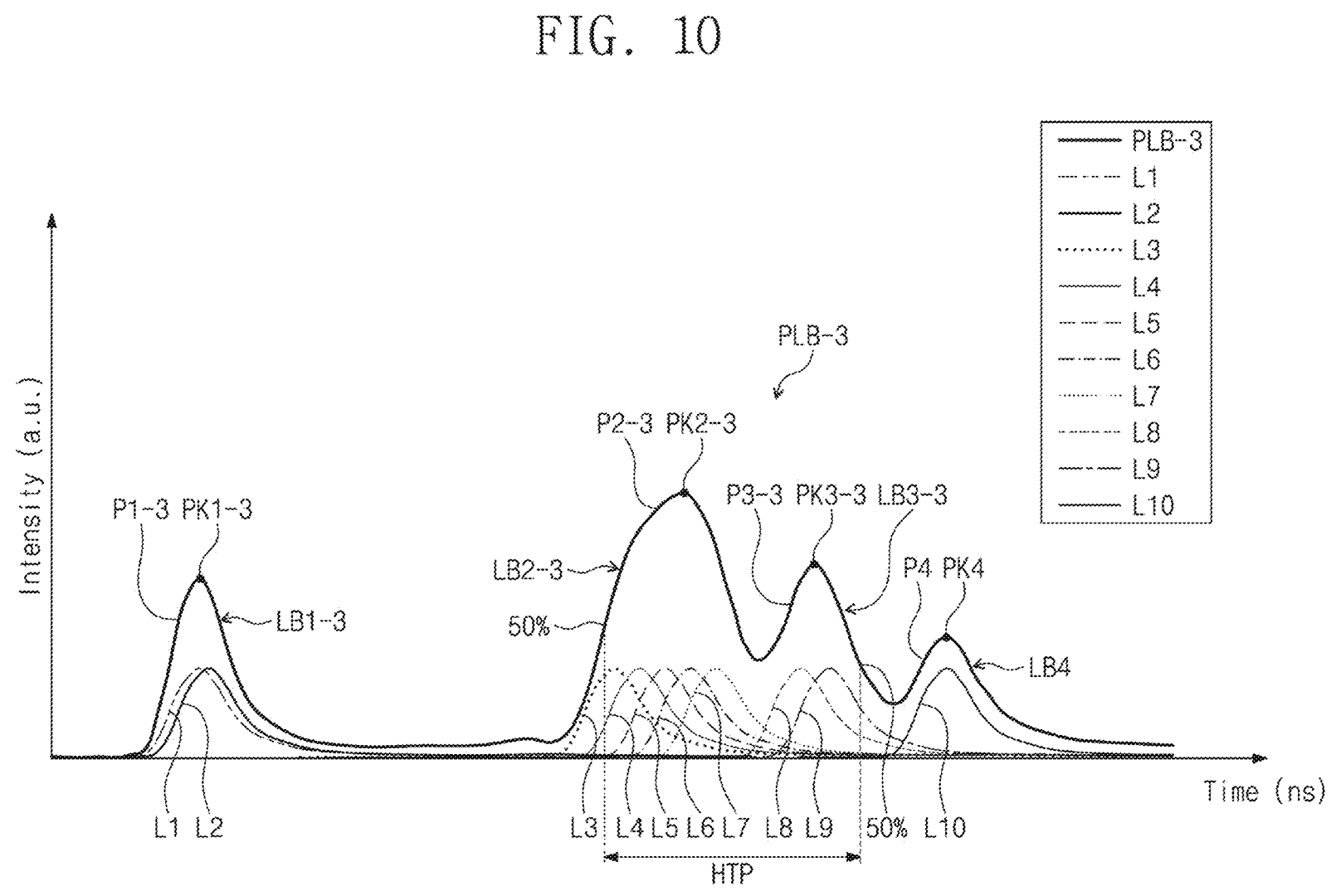

Referring to FIG. 10, the processing beam PLB-3 may be generated by mixing the first to tenth laser beams L1 to L10 emitted at different timings. The processing beam PLB-3 may include a first processing laser beam LB1-3 having a first pulse P1-3, a second processing laser beam LB2-3 having a second pulse P2-3, a third processing laser beam LB3-3 having a third pulse P3-3, and a fourth processing laser beam LB4 having a fourth pulse P4. The fourth pulse P4 may follow the third pulse P3-3.

The first pulse P1-3 and the second pulse P2-3 may be spaced apart from each other. The second pulse P2-3 and the third pulse P3-3 may partially overlap each other. The third pulse P3-3 and the fourth pulse P4 may partially overlap each other.

The first processing laser beam LB1-3 may be generated by mixing the first and second laser beams L1 and L2. The second processing laser beam LB2-3 may be generated by mixing the third to seventh laser beams L3 to L7. The third processing laser beam LB3-3 may be generated by mixing the eighth and ninth laser beams L8 and L9. The fourth processing laser beam LB4 may be generated by the tenth laser beam L10.

A first peak PK1-3 may be smaller than a second peak PK2-3, and a third peak PK3-3 may be smaller than the second peak PK2-3. The third peak PK3-3 may be greater than the first peak PK1-3, and a fourth peak PK4 may be smaller than the third peak PK3-3. The fourth peak PK4 may be smaller than the first peak PK1-3. The fourth processing laser beam LB4 may be irradiated to the semiconductor layer SML in a crystallization process.

To more regularly form an arrangement state of grain patterns GID, the fourth processing laser beam LB4 may be additionally irradiated to the semiconductor layer SML after the third processing laser beam LB3-3 is irradiated to the semiconductor layer SML.

Figure 11:
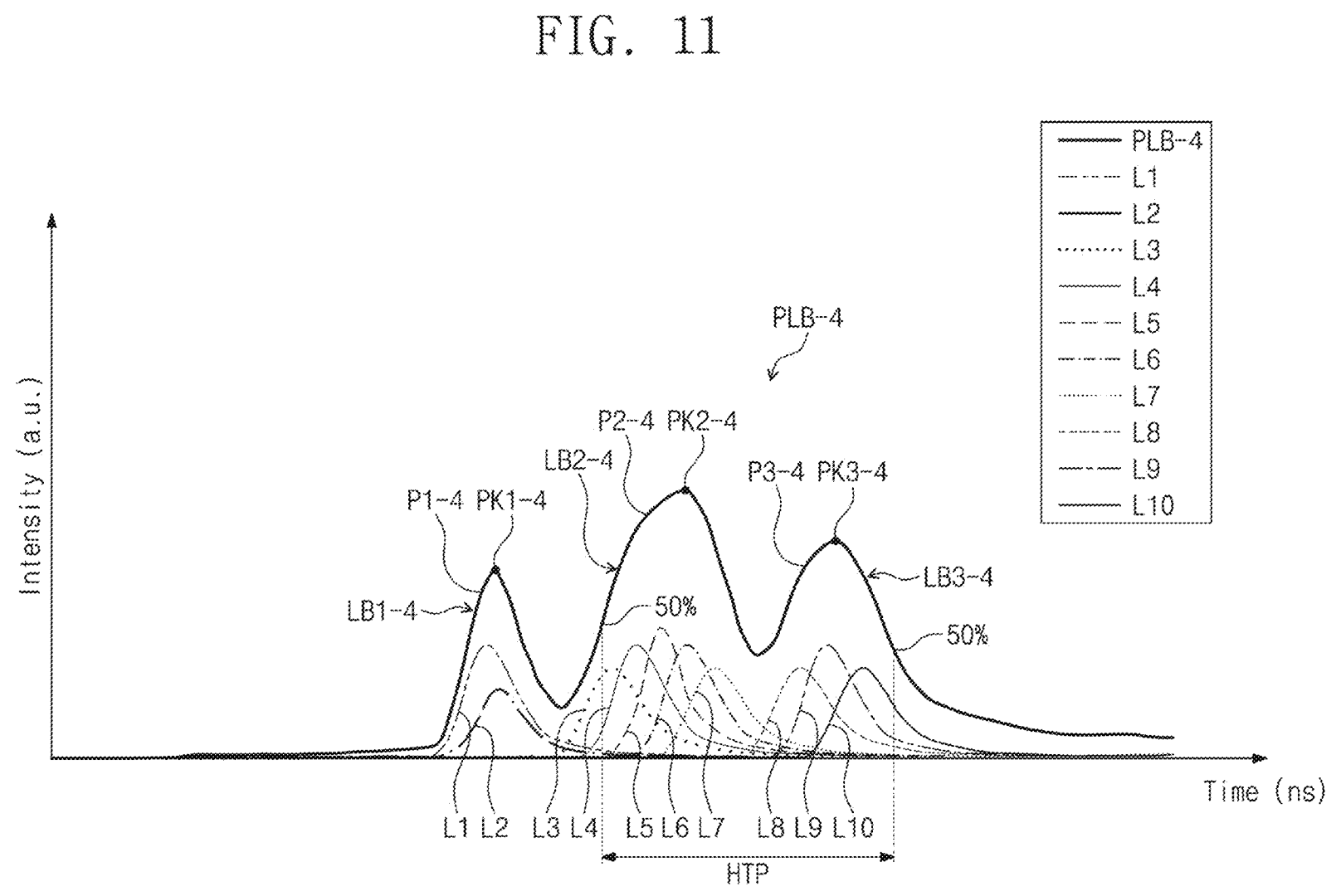

Referring to FIG. 11, the processing beam PLB-4 may be generated by mixing the first to tenth laser beams L1 to L10 that are emitted from the lasers LAR at different timings and of which powers are adjusted by the attenuators ATA. The processing beam PLB-4 may include a first processing laser beam LB1-4 having a first pulse P1-4, a second processing laser beam LB2-4 having a second pulse P2-4, and a third processing laser beam LB3-4 having a third pulse P3-4. The first pulse P1-4 and the second pulse P2-4 may partially overlap each other, and the second pulse P2-4 and the third pulse P3-4 may partially overlap each other.

The powers of at least two laser beams L may be differently adjusted by the attenuators ATA to generate the first, second, and third processing laser beams LB1-4, LB2-4, and LB3-4.

The first processing laser beam LB1-4 may be generated by mixing the first and second laser beams L1 and L2. The powers of the first and second laser beams L1 and L2 may be adjusted by the attenuators ATA so as to be different from each other. In an embodiment, the power of the first laser beam L1 may be higher than the power of the second laser beam L2, for example.

The second processing laser beam LB2-4 may be generated by mixing the third to seventh laser beams L3 to L7. The third and fourth laser beams L3 and L4 and the sixth and seventh laser beams L6 and L7 may be adjusted by the attenuators ATA to have different powers from the fifth laser beam L5. In an embodiment, the power of the fifth laser beam L5 may be higher than the powers of the fourth and sixth laser beams L4 and L6, and the powers of the fourth and sixth laser beams L4 and L6 may be higher than the powers of the third and seventh laser beams L3 and L7, for example.

The third processing laser beam LB3-4 may be generated by mixing the eighth to tenth laser beams L8 to L10. The ninth laser beam L9 may be adjusted by the attenuators ATA to have different power from the eighth and tenth laser beams L8 and L10. In an embodiment, the power of the ninth laser beam L9 may be higher than the powers of the eighth and tenth laser beams L8 and L10, for example.

A first peak PK1-4 may be smaller than a second peak PK2-4, and a third peak PK3-4 may be smaller than the second peak PK2-4 and greater than the first peak PK1-4.

Figure 12:
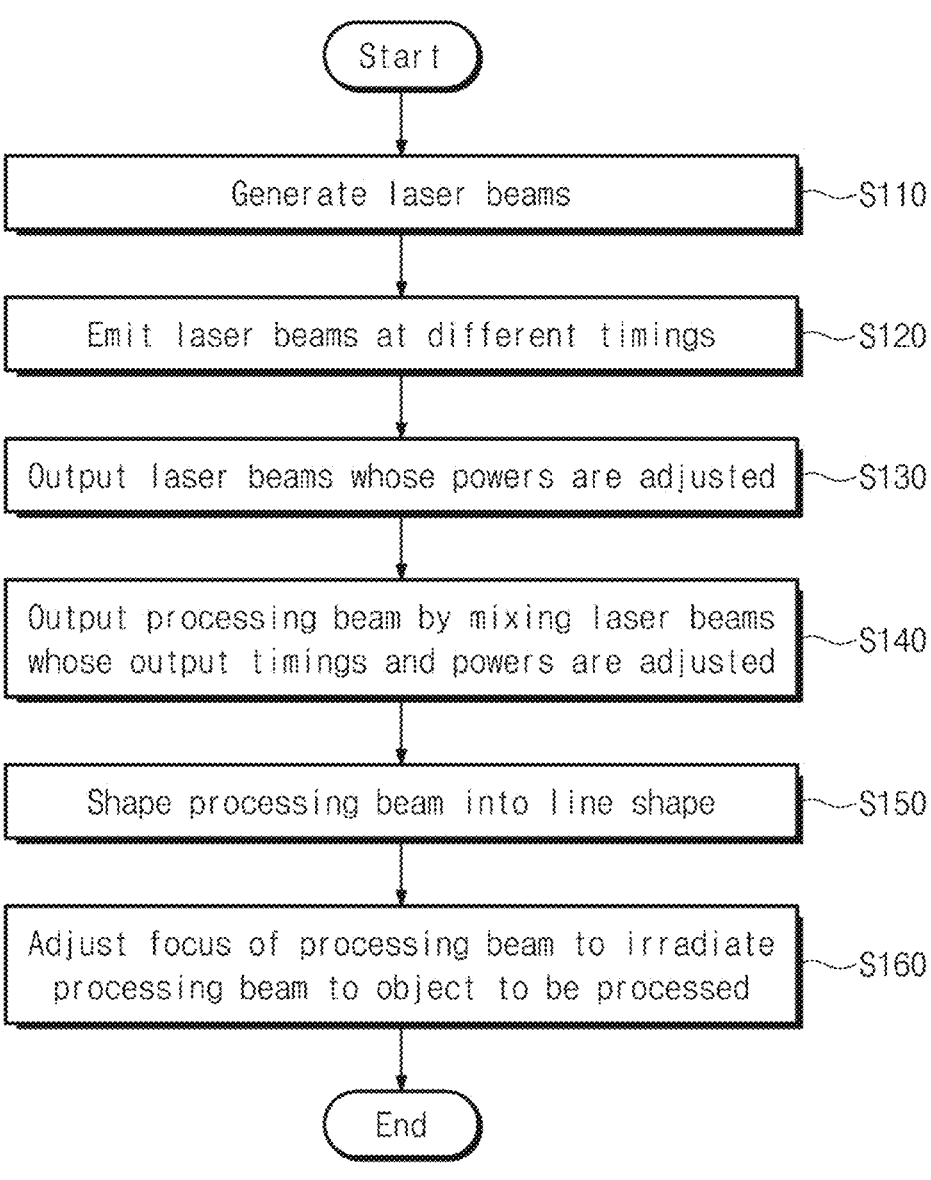
FIG. 12 is a flowchart for explaining a laser annealing method using the laser annealing apparatus illustrated in FIG. 1.

FIG. 12 is a flowchart for explaining a laser annealing method using the laser annealing apparatus illustrated in FIG. 1.

Referring to FIGS. 1 and 12, in operation S110, a plurality of laser beams L may be generated by the lasers LAR. As described above, the laser beams L may include first to tenth laser beams L1 to L10. In operation S120, the laser beams L may be emitted at different timings under the control of the laser controller LAC.

In operation S130, the laser beams L of which powers are adjusted by the attenuators ATA may be output. As described above, the powers of the laser beams L may be adjusted to be equal to one another, or the powers of some of the laser beams L may be adjusted to be different from one another.

In operation S140, the laser beams L of which output timings and powers are adjusted may be mixed by the beam mixer optics BMO, and a processing beam PLB may be output. At least two laser beams L among the laser beams L may be mixed to generate a first processing laser beam LB1. At least two other laser beams L among the laser beams L may be mixed to generate a second processing laser beam LB2. At least two other laser beams L among the laser beams L may be mixed to generate a third processing laser beam LB3.

In operation S150, the processing beam PLB may be shaped into a line shape by the flat line beam optics FLO. In operation S160, the processing beam PLB of which focus is adjusted by the focus optics FCO may be irradiated to an object to be processed.

By the embodiments of the invention, the laser annealing apparatus may easily generate the first processing laser beam with low power and the second processing laser beam with high power by mixing the plurality of laser beams. The laser annealing apparatus may perform the dehydrogenation process of removing hydrogen from the semiconductor layer in advance with the first laser beam and thereafter may perform the crystallization process of the semiconductor layer with the second laser beam. As the hydrogen is removed from the semiconductor layer in advance, damage to the semiconductor layer that is likely to be caused by the hydrogen may be prevented in the crystallization process.

While the invention has been described with reference to embodiments thereof, it will be apparent to those of ordinary skill in the art that various changes and modifications may be made thereto without departing from the spirit and scope of the invention as set forth in the following claims.

What is claimed is:
1. A laser annealing apparatus comprising:
a plurality of lasers;
a laser controller which controls emitting timings of a plurality of laser beams generated by the plurality of lasers;

beam mixer optics which output a processing beam by combining the plurality of laser beams of which output timings are adjusted, the processing beam including:

a first processing laser beam having a first pulse;

a second processing laser beam having a second pulse following the first pulse; and a third processing laser beam having a third pulse following the second pulse; and focus optics which output the processing beam of which focus is adjusted, wherein a first peak of the first pulse is smaller than a second peak of the second pulse, and a third peak of the third pulse is smaller than the second peak, and the first pulse is spaced apart from the second pulse, and the second pulse and the third pulse partially overlap each other.

2. The laser annealing apparatus of claim 1, wherein a first valley between the first pulse and the second pulse is set to percent or less of the second peak.

3. The laser annealing apparatus of claim 1, wherein a second valley between the second pulse and the third pulse is set to 60 percent or less of the second peak.

4. The laser annealing apparatus of claim 1, wherein a time interval between a left point of the second pulse corresponding to 50 percent of the second peak and a right point of the third pulse corresponding to 50 percent of the third peak is set to about 40 nanoseconds to about-200 nanoseconds.

5. The laser annealing apparatus of claim 1, wherein each of the first, second, and third processing laser beams is generated by combining at least two laser beams among the plurality of laser beams.

6. The laser annealing apparatus of claim 5, wherein a number of laser beams constituting the second processing laser beam, among the plurality of laser beams, is greater than a number of laser beams constituting the third processing laser beam, among the plurality of laser beams, and a number of laser beams constituting the first processing laser beam, among the plurality of laser beams.

7. The laser annealing apparatus of claim 1, wherein the first pulse and the second pulse partially overlap each other, and the second pulse and the third pulse partially overlap each other.

8. The laser annealing apparatus of claim 1, wherein the third peak is greater than the first peak.

9. The laser annealing apparatus of claim 1, wherein the third peak is equal to the first peak.

10. The laser annealing apparatus of claim 1, wherein the third peak is smaller than the first peak.

11. The laser annealing apparatus of claim 1, wherein the first peak includes a plurality of sub-peaks having different values from each other.

12. The laser annealing apparatus of claim 1, further comprising:

a plurality of attenuators which adjust powers of the plurality of laser beams provided from the plurality of lasers and provide the plurality of laser beams to the beam mixer optics, wherein powers of at least two laser beams among the plurality of laser beams are adjusted by the attenuators so as to be different from each other.

13. The laser annealing apparatus of claim 1, wherein the processing beam further includes a fourth processing laser beam having a fourth pulse following the third processing pulse, and wherein the third pulse and the fourth pulse partially overlap each other, and a fourth peak of the fourth pulse is smaller than the third peak.

14. The laser annealing apparatus of claim 13, wherein the fourth peak is smaller than the first peak.

* * * * *